Nov. 20, 1956 H. J. RYAN 2,771,223
LINE MARKING MACHINE
Filed Aug. 10, 1953 3 Sheets-Sheet 1

INVENTOR.
HERL J. RYAN
BY
Lynn Latta
ATTORNEY

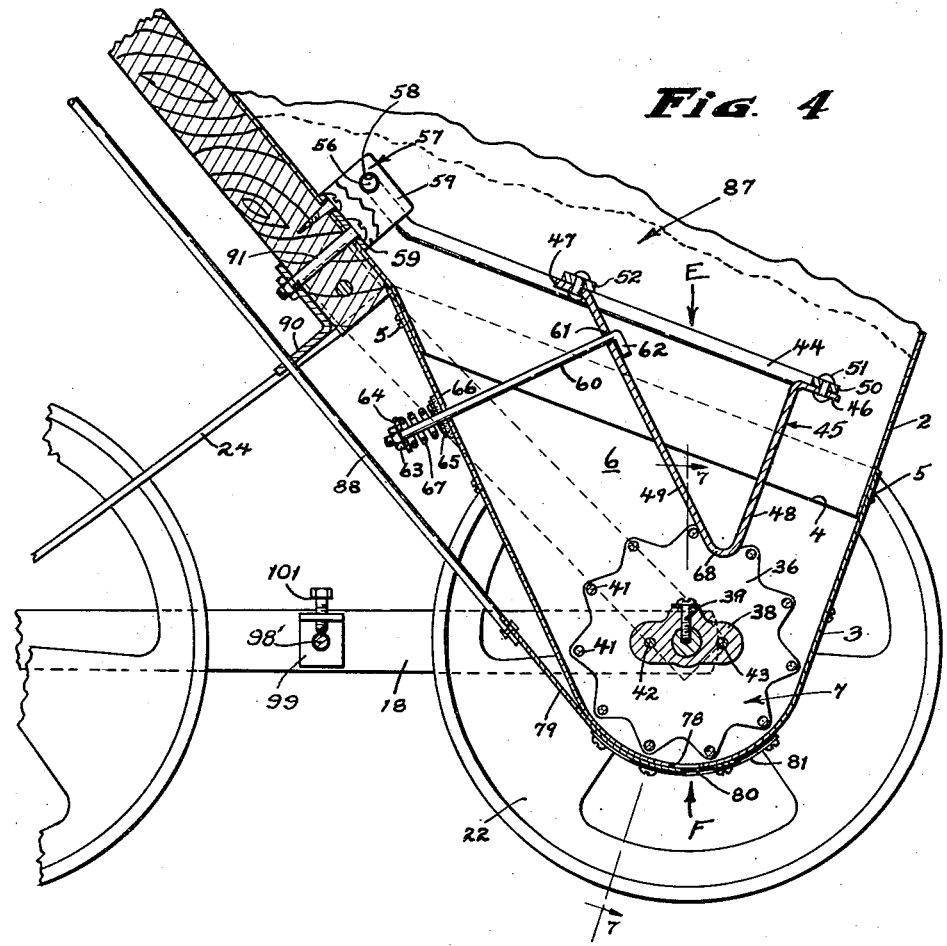
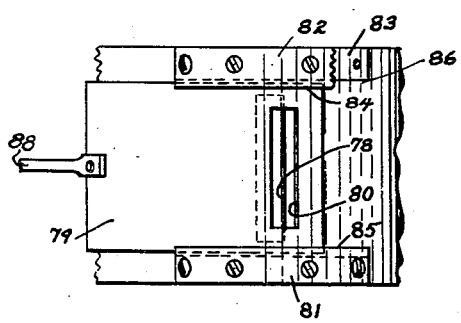

Nov. 20, 1956 H. J. RYAN 2,771,223
LINE MARKING MACHINE
Filed Aug. 10, 1953 3 Sheets-Sheet 3
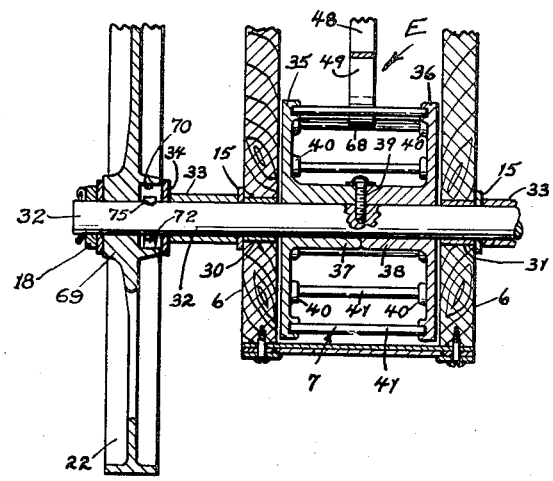
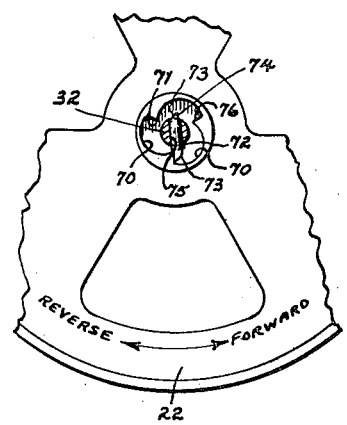
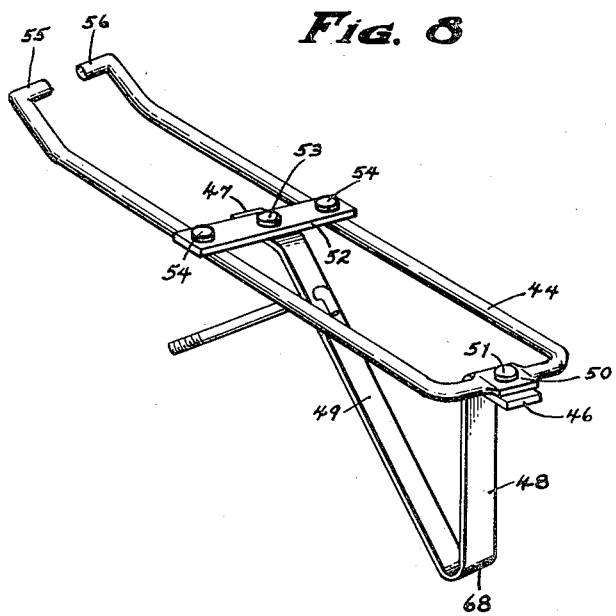
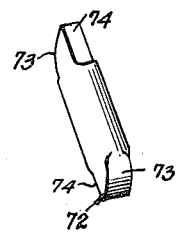
INVENTOR.
HERL J. RYAN
BY
Lynn Latta
ATTORNEY

United States Patent Office 2,771,223
Patented Nov. 20, 1956

2,771,223

LINE MARKING MACHINE

Herl J. Ryan, Los Angeles, Calif.

Application August 10, 1953, Serial No. 373,135

9 Claims. (Cl. 222—177)

This invention relates to a line marking device incorporating several improvements over the general type of line marking device shown in the Patents Nos. 1,882,340 and 1,940,606 issued to me on October 11, 1932 and December 19, 1933 respectively.

One object of the invention is to provide an improved agitating assembly for mounting within the mixing chamber of a hopper.

Another object of the invention is to provide an improved gate type valve for closing off the discharge opening in the hopper and for regulating the flow rate of marking powder through the discharge opening.

A further object of the invention is to provide an actuating rod for the gate valve which is mounted on the device in a novel manner so as to be adjustable for varying the position of the valve gate relative to the hopper discharge opening.

A further object of the invention is to provide an improved carriage assembly for supporting the hopper relative to four ground wheels wherein two of the frame members accommodate a novel gauge device.

Another object of the invention is to provide a one-way driving clutch in one pair of the ground wheels to prevent actuation of the agitator when the line marking machine is wheeled in reverse, said clutch becoming automatically engaged for actuation of the agitator when the machine is again wheeled in a forward direction.

Other objects and advantages will become apparent upon examination of the following specification and appended three sheets of drawings in which:

Fig. 4 is a sectional view through the lower portion of the machine;

Fig. 5 is a fragmentary detail view of the gate valve;

Fig. 6 is a fragmentary detail view of the inner side of the right front (driving) wheel;

Fig. 7 is a detail sectional view of the central portion of the machine, taken on line 7—7 of Fig. 4;

Fig. 8 is a detail perspective view of the agitator; and

Fig. 9 is a detail view of the clutch pin.

Figure 1:
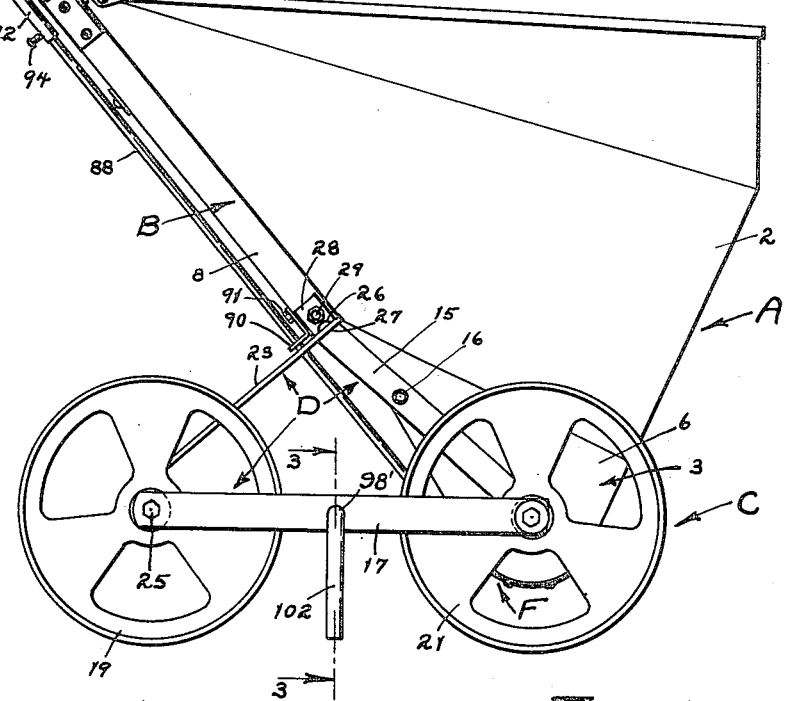
Fig. 1 is a side elevational view of my line marking machine.

The line marking machine includes generally a hopper A, a handle B, a wheel assembly C, a frame D, an agitator assembly E, a gate valve F and a hand-grip assembly G.

The hopper includes an upper section 2 formed of sheet metal such as steel or aluminum and a lower section 3 which may overlap the mouth portion 4 of the upper section and be secured thereto by screws 5. The lower section preferably has opposed side walls 6 of wood and a continuous strip of sheet metal conformed and secured to the margins of the side walls to define a discharge chamber at the bottom of the hopper. The lower section 3 has a semi-cylindric floor surface generated from the axis of the agitator rotor 7.

The handle B comprises a shank 8 fixed to the rear wall of the hopper and projecting upwardly beyond the upper end of the hopper. At the upper end of the shank B, a pair of hand grips 9 and 10 are abutted against gusset plates 11 which embrace the upper end of shank 8. A bolt 12 extends through both hand grips, through gusset plates 11, through the upper end of handle shank 8, and bridges a slot 13 in the upper end of shank 8. Gusset plates 11 lend rigidity to the overall hand grip assembly. The bolt 12 also serves as a trunnion on which the valve manipulating lever 14 is pivoted. Lever 14 is embraced by the furcations of handle shank 8 on opposite sides of slot 13, the latter being disposed in the vertical median plane of the longitudinal axis of shank 8, whereby lever 14 is maintained in a vertical plane, for pivotal movement on the transverse axis of bolt 12.

The hopper is supported above the four ground wheels by the frame members D which include: a pair of metal bracing strips 15 anchored on opposite sides of the lower section 3 by bolts 16; spacer bars 17 and 18 which serve to maintain the rear wheels 19 and 20 in spaced relation to the front wheels 21 and 22 and diagonal bracing strips 23 and 24 which are fixed to the rear axle 25 and to the respective braces 15 as by rivets or bolts 26. The braces 15 may be bent inwardly at 27 and then upwardly to accommodate the braces 23, 24 and to provide extensions 28 which are anchored to the lower end of the handle shank by bolt 29.

The side walls of the hopper may converge toward each other to form the rather narrow but elongated discharge mouth 4 to which the lower section 3 of the hopper is attached. The side walls 6 are preferably maintained parallel to each other and are provided with bushings 30 and 31 through which the front axle 32 extends, the axle being rotatably carried by said bearings. Spacer sleeves 33 piloted on the axle maintain the front wheels in spaced relation to the side walls 6 so that the wheels clear the converging side walls of the upper section of the hopper—stability against lateral tipping of the machine also being accomplished. Washers 34 take the end thrust on the wheels hubs.

The rotor 7 which actuates the agitating device comprises a pair of like castings 35 and 36 having hub portions 37 and 38 abutting each other, and a set screw 39 securing each casting against rotation on the axle. Bolts 42 and 43 extend through the two castings 35, 36, clamping them rigidly together. Each casting has a series of lugs 40 formed about its inner peripheral margin, each lug having a bore into which one end of a pin 41 is received. The pins are spaced substantially equidistantly from the axis of the axle and hence lie in substantially a circular path about the axis of axle 32.

The agitating device comprises a generally U-shaped carrier 44 to which a V-shaped tongue 45 is anchored. The tongue has flange portions 46 and 47 formed at the free ends of its respective legs 48 and 49, flange 46 being anchored by a rivet 51 to a flattened web portion 50 of carrier 44 and flange 47 being anchored to a cross bar 52 by a rivet 53, said cross bar being anchored to the legs of the carrier by means of rivets 54. The respective legs of the carrier are bent inwardly at their free ends to form trunnions 55, 56. A U-shaped bracket 57 has an opening 58 in each of its side walls 59 and the trunnions 55, 56 are pivoted in the openings 58 of the respective side walls, the carrier 44 thus being free to swing vertically relative to bracket 57 about the common axis of the carrier trunnions. A pull rod 60 extends through an opening 61 in leg 49 and has at one end a finger 62 bent over to engage the upper face of the leg, the pull rod projecting through the rear wall of the hopper and having a nut 63 threaded onto its free end. A compression spring 67 is piloted on the pull rod 60 between thrust washers 64 and 65 and a felt washer 66 functions to reduce the noise which would otherwise be transmitted in amplified form through the hopper walls when the agitating device is in operation. The compression spring 67 continuously urges the pull rod and the agitator tongue 45 in a clockwise direction (viewing Fig. 4) about the axis of the carrier trunnions. Thus the apex 68 of the agitator tongue is in continuous resilient engagement with the perimeter of the rotor 7.

One of the front ground wheels, such as 22, is provided with a one-way clutch device positioned within the wheel hub. The hub 69 has formed in its interior three symmetrical cam or ratchet faces 70 each of which terminates with a clutch tooth 71 the apex of which is closer to the axis of the hub than any other point on the cam surface. A clutch pin 72, loosely slidable within a diametrical bore 75 in the axle, is formed symmetrically at either end—having at each end a rounded ratcheting face 73 on one side and a flat driving face 74 on the other side. The driving face 74 engages the radial wall 76 of a clutch tooth 71 when the line marking machine is propelled in a forwardly direction. When the wheel 22 is rotated in reverse (clockwise as viewed in Fig. 6) the rounded rear faces 73 of the clutch pin 72 will ratchet on the adjacent ratchet faces 70 in the wheel hub (the pin 72 sliding in bore 75) and the wheel 22 "free wheels" relative to the axle 32. Since the faces 73 are of single curvature, and are of straight-line cross section, they will engage cam surfaces 70 in a manner to hold the clutch pin against rotation in bore 75. Thus the wear against the cam faces is distributed throughout the axial width thereof, greatly prolonging the life of the clutch. The length of the clutch pin is less than the distance between any pair of diametrically opposed radially inward extremities of the three cam surfaces, so that when one end of the pin is in contact with a cam surface the opposite end of the pin always clears its adjacent cam surface. However, when wheel 22 is rotated forwardly (counter-clockwise as viewed in Fig. 6) the axle remains stationary until such time as the nearest clutch tooth 71 engages the front face 74 of that end of the clutch pin which is projecting far enough beyond the axle to be in the path of the oncoming clutch tooth. If the clutch pin should be horizontal, one end thereof will be projecting to drive position as the result of the other end having been pushed inwardly during the last ratcheting engagement thereof by a cam face 70. In this connection, it will be noted that the distance from the apex of each clutch tooth to the circumferential wall of the axle is less than the distance which at least one end of the clutch pin projects beyond the circumferential wall of the axle (even when each end of said pin is projecting an equal distance beyond such circumferential wall). Thus driving connection is always established between the wheel 22 and axle 32 whenever the machine is wheeled in a forwardly direction and a free wheeling condition (axle 32 remaining stationary) exists when the machine is wheeled in a reverse direction.

Figure 2:
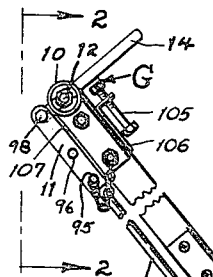
Fig. 2 is a fragmentary detail view taken on line 2—2 of Fig. 1.
Figure 2:
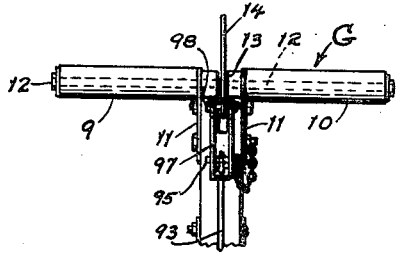

The lower section 3 of the hopper is provided with a discharge opening 78 in its floor area and a gate valve 79 is likewise provided with an opening 80. A pair of guide strips 81 and 82 are anchored to opposite sides of the lower section 3 of the hopper and exteriorly thereof, said strips being parallel to each other and conformed to the rounded bottom of the hopper. Additional guide strips 83 likewise conform to the rounded bottom of the hopper and serve to space the strips 81 and 82 from the hopper wall, the strips 81 and 82 having their internal marginal edges 84 and 85 overhanging the internal marginal edges 86 of the underneath strips. The gate valve is of thin sheet material sufficiently flexible to conform to the rounded contour of the hopper floor and said valve is slidably received beneath the overhanging marginal edges of strips 81 and 82 and between the marginal edges of strips 83. The rate of flow of the powder 87 through the discharge openings 78 and 80 is of course regulated by the extent to which such openings are brought into registry by manipulation of the gate valve. The gate valve is actuated by a rod 88 which in turn is actuated rectilinearly of the handle shank 8 by swinging lever 14 about its supporting trunnion 12. The rod 88 is pivoted through an opening in a guide bracket 90 which is anchored to the lower end of the handle shank by means of a bolt 91, which bolt also anchors the U-bracket 57 to the handle shank. A coupling sleeve 92 fixed to the end of rod 93 is telescoped over the end of rod 88 and secured thereto by a set screw 94. Viewing Fig. 2 the upper end of rod 93 has at its upper end an opening through which a removable pin 95 projects when such opening is in registry with one of two pairs of openings 96 in the spaced legs of a clevis 97. The clevis 97 is suspended on a pivot pin 98 which is carried by the lower end of valve manipulating lever 14. When adjustment of the gate valve relative to the hopper floor is desired, it is only necessary to withdraw pin 95 and re-insert it after the opening in rod 93 is aligned with a new pair of openings 96 in the clevis 97.

Figure 3:
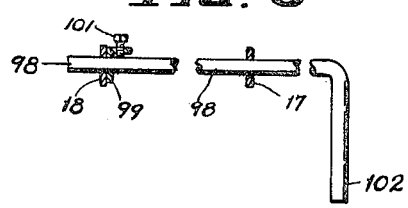
Fig. 3 is a fragmentary detail view taken on line 3—3 of Fig. 1.

The parallel braces 17 and 18 serve to accommodate a line marker rod 98′, one of the braces having an angle bracket 99 (Figs. 3 and 4) secured to its inner face. The gauge rod is extended through openings in the bracket 99 and braces 17, 18 and a set screw 101 is threaded through bracket 99 to anchor the gauge rod in a pre-selected position of adjustment relative to the braces 17 and 18, it being understood that the screw 101 can be loosened to change the position of adjustment of the gauge rod as desired. The gauge rod 98′ has a downwardly projecting finger 102 which may be caused to follow a guide line so as to guide the machine in a path which will result in a pre-determined line being formed on the ground by the powder discharged from the hopper of the machine as it progresses along such guided path.

In the operation of the machine the gauge rod 98′ may or may not be employed, and if employed, then the gauge rod is first adjusted so that the finger 102 is spaced a pre-selected distance outwardly from the side of the machine. Then the initial adjustment of the gate valve is effected by inserting the pin 95 into the desired pair of openings 96. Then lever 14 is manipulated until the desired extent of registry between discharge openings 78 and 80 is obtained. The gate valve will remain in the position selected by manipulation of lever 14 due to the frictional contact of said valve with the hopper floor and the guide strips. When the machine is wheeled in a forward direction the clutch pins 72 each engage one of the clutch teeth 71 and wheels 22 drive axle 32. As the rotor 7 is rotated by axle 32 the transverse pins 41 successively engage the apex 68 of the agitator tongue to raise and lower the tongue. Thus during the forward movement of the machine, the tongue and associated carrier 44 are being constantly oscillated against the resistance of spring 67. As the apex 68 passes over each pin, it drops rapidly into the pocket formed between adjacent pins, whereby the tongue 45 will effect an agitating action. An agitating action is also imparted by the carrier 44 for causing the powder in the hopper to continue to flow toward the floor of the hopper.

The above mentioned feature of cooperation between the respective end surfaces of the driving pawls 72 and the respective faces of clutch teeth 71, simplifies the manufacture of the clutch units by making it possible to utilize simple cylindrical pins as the basic structure of the pawls, and to mount said pins in simple cylindrical bores without resorting to keys, keyways, etc. for restraining rotation. Restraint of the pawls from rotation is essential in order that the driving faces 74 thereof may be always maintained in forwardly facing positions, for correct engagement with the driving faces 76 of the clutch teeth.

For limiting the extent of movement of lever 14 (whereby to limit the degree of possible adjustment of valve plate 79 toward the open position from a position of maximum closure thereof) there is provided an adjustable stop consisting in a screw 105 which is threaded through an L-shaped bracket 106 secured to the upper end of handle shaft B. Screw 105 has a head at both ends, one to function as a knob for manipulating the screw, and the other, in normally spaced relation to lever 14, providing a broad surface against which the lever 14 may make abutting contact to limit its movement.

Covering and uncovering the valve opening 78 in the bottom of hopper 3 is controlled by the rearward edge of slot 80 in gate valve 79 when the push rod 93 is in extended relation to clevis 11 (with pin 95 coupled in the lower pair of openings 96 of the clevis as shown in Fig. 1) whereas, when the clevis and push rod 93 are in close coupled relation (with pin 95 in the upper pair of openings 96) the slot 80 will be inoperative and the forward edge of gate valve 79 will execute a cut-off action with reference to hopper aperture 78. In the latter case, the line which is deposited upon the ground by the apparatus will be a maximum width line determined by the longitudinal dimension of hopper aperture 78, whereas in the former case, the line will be a minimum width line determined by the shorter longitudinal dimension of gate aperture 80. Thus the two positions of coupling between the upper end of rod 93 and clevis 11 determine the change-over from a narrow line to a wide line and vice versa.

It may further be pointed out that the function of adjustment screw 105, as it is adjusted from one setting to another, is to vary the extent of opening of the discharge aperture, whereby to vary the rate of flow from the hopper, thereby varying the depth of the layer of material which is deposited upon the ground to form the line. In this connection, it may be noted that the normal operation of the gate valve 79 will be from a fully open to a fully closed position, so as to entirely cut off the flow of material whenever desired. The fully open position is a variable position, determined by the abutment of lever 14 against stop screw 105. The fully closed position is a fixed position, determined by the engagement of the forward edge of the downwardly projecting portion of lever 14 (immediately above pin 98) against the upper, rearward edge of a stop plate 107 (Fig. 1) which is fastened to the under side of handle shank B, bridging across the rear portion of slot 13. In Fig. 1 the lever 14 is in engagement with the stop plate 107 and thus in the fixed limit position which determines the full closing of gate valve 79. In Fig. 4, the gate valve is shown in the variable open position which is determined by the engagement of lever 14 against stop screw 105, in the position of adjustment of the latter shown in Fig. 1. It will be apparent that by adjusting stop screw 105 downwardly and forwardly from the position of Fig. 1, that a greater degree of opening of the discharge aperture will be provided.

I claim:

1. In a line marking apparatus: a hopper provided in its bottom with a discharge opening; a wheeled supporting carriage including a shaft extending transversely through said hopper and caused to rotate by the travelling movement of the carriage; and agitating mechanism comprising an agitator rotor of open squirrel-cage form, including a plurality of circumferentially spaced bars parallel to said shaft, said rotor being mounted on said shaft and secured thereto for rotation therewith, whereby said bars will sweep across said discharge opening for clearing the same; a vertically reciprocable agitator including a carrier pivoted in the hopper rearwardly of the rotor and extending forwardly thereover, and a downwardly projecting forward end part riding on the periphery of said rotor and adapted to be alternately lifted by successively passing bars of said rotor and dropped into successive spaces between said bars so as to agitate material within said hopper in a manner to feed it downwardly through said rotor while inhibiting packing of the material within the rotor and spring means connected between said lower end part and the rear wall of said hopper and exerting a downward pull on said carrier to cause it to strike the succeeding rotor bars with spring energized impact.

2. In a line marking apparatus: a hopper provided in its bottom with a discharge opening; a wheeled supporting carriage including a shaft extending transversely through said hopper and caused to rotate by the traveling movement of the carriage; and agitating mechanism comprising an agitator rotor of open squirrel-cage form, including a plurality of circumferentially spaced cylindrical bars parallel to said shaft, said rotor being mounted on said shaft and secured thereto for rotation therewith, whereby said bars will sweep across said discharge opening for clearing the same; and a vertically reciprocable agitator comprising a carrier comprising spaced, parallel side arms pivoted to the hopper upwardly and rearwardly of the rotor for vertically oscillating movement extending downwardly and forwardly over said rotor and having means joining their forward ends, and a tongue of V-shape including respective arms one end of which is attached to said joining means and the other end of which is attached to said carrier arms intermediate their ends, and an apex portion positioned to ride on the periphery of said rotor and adapted to be alternately lifted by successively passing bars of said rotor and dropped into successive spaces between said bars so as to agitate material within said hopper in a manner to feed it downwardly through said rotor while inhibiting packing of the material within the rotor.

3. Apparatus as defined in claim 2, wherein said tongue is of strap metal and said apex portion is of cylindrically curved form, with the axis of its curvature parallel to said rotor bars.

4. In a line marking apparatus: a hopper having a bottom that is cylindrically curved about a transverse axis and is provided with a transverse discharge slot, parallel to said axis; a wheeled supporting carriage including a shaft extending transversely through said hopper and caused to rotate by the travelling movement of the carriage; and agitating mechanism comprising an agitator rotor of open squirrel-cage form, including a plurality of circumferenitally spaced bars parallel to said shaft, said rotor being mounted on said shaft and secured thereto for rotation therewith, whereby said bars will sweep across said discharge opening for clearing the same; and and a vertically reciprocable agitator having a carrier arm pivoted to said hopper, having an end part riding on the periphery of said rotor and adapted to be alternately lifted by succesive passing bars of said rotor and dropped into successive spaces between said bars so as to agitate material within said hopper in a manner to feed it downwardly through said rotor while inhibiting packing of the material within the rotor and having means spring loading it downwardly for spring-energized impact against succeeding bars of said rotor, said agitator end part having its path of movement intersecting the rotor periphery forwardly of the rotor axis, so as to push the material through the forward portion of the agitator, said forward portion moving downwardly and constituting the more active portion of the rotor.

5. In a line marking apparatus: a hopper provided in its bottom with a discharge opening; a wheeled supporting carriage including a shaft extending transversely through said hopper and caused to rotate by the travelling movement of the carriage; and agitating mechanism comprising an agitator rotor of open squirrel-cage form, including a plurality of circumferentially spaced cylindrical bars parallel to said shaft, said rotor being mounted on said shaft and secured thereto for rotation therewith, whereby said bars will sweep across said discharge opening for clearing the same; and a vertically reciprocable agitator comprising a carrier including spaced, parallel side arms pivoted to the hopper upwardly and rearwardly of the rotor for vertically oscillating movement, extending downwardly and forwardly over said rotor and having means joining their forward ends, and a tongue of V-shape including respective arms one end of which is attached to said joining means and the other end of which is attached to said carrier arms intermediate their ends, and an apex portion positioned to ride on the periphery of said rotor and adapted to be alternately lifted by successively passing bars of said rotor and dropped into successive spaces between said bars so as to agitate material within said hopper in a manner to feed it downwardly through said rotor while inhibiting packing of the material within the rotor, the rear arm of said tongue and the rear wall of said hopper being provided respectively with aligned openings, and including a pull rod extending through said openings and having an inner end provided with a head portion engaging said rear arm, and a coil spring under adjustable compression between the outer end of said pull rod and the outer face of said rear hopper wall, for yieldingly urging said tongue downwardly against the periphery of said rotor.

6. In a line marking apparatus: a hopper provided in its bottom with a discharge opening; a wheeled supporting carriage including a shaft extending transversely through said hopper and caused to rotate by the travelling movement of the carriage; and agitating mechanism comprising an agitator rotor of open squirrel-cage form, including a plurality of circumferentially spaced bars parallel to said shaft, said rotor being mounted on said shaft and secured thereto for rotation therewith, whereby said bars will sweep across said discharge opening for clearing the same; and a vertically reciprocable agitator comprising a carrier pivoted to the hopper rearwardly of the rotor for vertically oscillating movement and a tongue of V-shape including respective arms the ends of which are attached to the forward portion of said carrier and an apex portion positioned to ride on the periphery of said rotor and adapted to be alternately lifted by successively passing bars of said rotor and dropped into successive spaces between said bars so as to agitate material within said hopper in a manner to feed it downwardly through said rotor while inhibiting packing of the material within the rotor, the rear arm of said tongue and the rear wall of said hopper being provided respectively with aligned openings, and including a pull rod extending through said openings and having an inner end provided with a head portion engaging said rear arm, and a coil spring under adjustable compression between the outer end of said pull rod and the outer face of said rear hopper wall, for yieldingly urging said tongue downwardly against the periphery of said rotor.

7. In a line marking apparatus: a hopper provided in its bottom with a discharge opening; a wheeled supporting carriage including a shaft extending transversely through said hopper and caused to rotate by the travelling movement of the carriage; and agitating mechanism comprising an agitator rotor of open squirrel-cage form, including a plurality of circumferentially spaced bars parallel to said shaft, said rotor being mounted on said shaft and secured thereto for rotation therewith, whereby said bars will sweep across said discharge opening for clearing the same; and a vertically reciprocable agitator comprising a carrier pivoted to the hopper rearwardly of the rotor for vertically oscillating movement and a tongue of V-shape including respective arms the ends of which are attached to the forward portion of said carrier and an apex portion positioned to ride on the periphery of said rotor and adapted to be alternately lifted by successively passing bars of said rotor and dropped into successive spaces between said bars so as to agitate material within said hopper in a manner to feed it downwardly through said rotor while inhibiting packing of the material within the rotor; said carrier being in the form of an elongated rectangular yoke having side arms the rear ends of which are bent inwardly to provide trunnions, said yoke having a web portion joining the forward ends of said arms, the forward arm of said tongue being secured to said web portion, said carrier including a cross bar extending between and attached to intermediate portions of said arms, the rear arm of said tongue being attached to said cross bar, and a bearing bracket mounted on said rear hopper wall, said trunnions being journalled in said bracket so as to provide the pivotal connection of said carrier to the hopper.

8. In a line marking apparatus: a hopper provided in its bottom with a discharge opening; a wheeled supporting carriage including a shaft extending transversely through said hopper and caused to rotate by the travelling movement of the carriage; and agitating mechanism comprising an agitator rotor of open squirrel-cage form, including a plurality of circumferentially spaced bars parallel to said shaft, said rotor being mounted on said shaft and secured thereto for rotation therewith, whereby said bars will sweep across said discharge opening for clearing the same; a vertically reciprocable agitator including a carrier pivoted in the hopper rearwardly of the rotor and extending forwardly thereover, and a downwardly projecting forward end part riding over the periphery of said rotor and adapted to be alternately lifted by successively passing bars of said rotor and dropped into successive spaces between said bars so as to agitate material within said hopper in a manner to feed it downwardly through said rotor while inhibiting packing of the material within the rotor, the rear wall of said hopper, and said agitator having respective aligned openings, and including a pull rod extending through said openings and having an inner end provided with a head engaging said agitator, and a coil spring under adjustable compression between the outer end of said pull rod and the outer face of said rear hopper wall, for yieldingly urging said tongue downwardly against the periphery of said rotor and causing said end part to strike the succeeding rotor bars with spring energized impact.

9. In a line marking apparatus; a hopper provided in its bottom with a discharge opening; a wheeled supporting carriage including a shaft extending transversely through said hopper and caused to rotate by the travelling movement of the carriage; and agitating mechanism comprising an agitator rotor of open squirrel-cage form, including a plurality of circumferentially spaced bars parallel to said shaft, said rotor being mounted on said shaft and secured thereto for rotation therewith, whereby said bars will sweep across said discharge opening for clearing the same; a vertically reciprocable agitator including a carrier pivoted in the hopper upwardly and rearwardly of the rotor and extending downwardly and forwardly thereover, and a downwardly projecting lower end part riding on the periphery of said rotor and adapted to be alternately lifted by successively passing bars of said rotor and dropped into succesive spaces between said bars so as to agitate material within said hopper in a manner to feed it downwardly through said rotor while inhibiting packing of the material within the rotor; said carrier being in the form of an elongated rectangular yoke having side arms the rear ends of which are bent inwardly to provide trunnions, said yoke having a web portion joining the forward ends of said arms, the forward arm of said tongue being secured to said web portion, said carrier including a cross bar extending between and attached to intermediate portions of said arms, the rear arm of said tongue being attached to said cross bar, and a bearing bracket mounted on said rear hopper wall, said trunnions being journalled in said bracket so as to provide the pivotal connection of said carrier to the hopper.

References Cited in the file of this patent

UNITED STATES PATENTS 85,379    Going _____ Dec. 29, 1868

(Other references on following page)

UNITED STATES PATENTS

| | | |
|---|---|---|
| 94,649 | Risedorph | Sept. 7, 1869 |
| 637,939 | Murray | Nov. 28, 1899 |
| 1,075,525 | Wells | Oct. 14, 1913 |
| 1,219,737 | Heilig | Mar. 20, 1917 |
| 1,373,852 | Allen | Apr. 5, 1921 |
| 1,461,944 | Setter | July 17, 1923 |
| 1,783,092 | Lewis | Nov. 25, 1930 |
| 1,940,606 | Ryan | Dec. 19, 1933 |
| 2,069,350 | Blue | Feb. 2, 1937 |
| 2,123,318 | Taylor | July 12, 1938 |
| 2,193,253 | Masters | Mar. 12, 1940 |
| 2,489,196 | Reising | Nov. 22, 1949 |